United States Patent [19]
Brand

[11] Patent Number: 5,310,347
[45] Date of Patent: May 10, 1994

[54] CARD GAME FOR SPELLING IMPROVEMENT AND EDUCATION

[76] Inventor: Chester Brand, 29055 Schwartz Rd., Westlake, Ohio 44145

[21] Appl. No.: 979,884

[22] Filed: Nov. 23, 1992

[51] Int. Cl.⁵ .................. G09B 1/00; G09B 19/00; A63F 1/00; A63F 9/20
[52] U.S. Cl. .................... 434/167; 273/299; 273/306; 273/302
[58] Field of Search .......... 434/167, 128, 129; 278/299, 306, 302

[56] References Cited

U.S. PATENT DOCUMENTS

| | | | |
|---|---|---|---|
| 792,345 | 6/1905 | Parker | 273/306 |
| 931,977 | 8/1909 | Wheeler | 273/306 |
| 1,982,534 | 11/1934 | Parker | 273/306 |
| 2,128,749 | 8/1938 | Koch et al. | 273/299 X |
| 2,687,306 | 8/1954 | Cheng | 273/306 X |
| 3,469,325 | 9/1967 | Greenberg | 434/167 |
| 5,112,059 | 5/1992 | Mundle et al. | 273/306 X |

Primary Examiner—Gene Mancene
Assistant Examiner—Cindy A. Cherichetti
Attorney, Agent, or Firm—Woodling, Krost & Rust

[57] ABSTRACT

A card game to facilitate the learning of spelling words. The card game is comprised of a number deck and a word deck. Players play the numbered cards and are then commanded to spell a word from a card from the word deck having a length equal to the additive sum of the numbered playing cards played.

15 Claims, 6 Drawing Sheets

FIG. 1
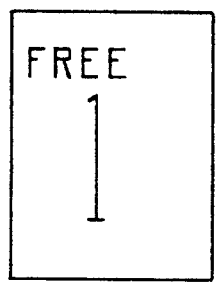
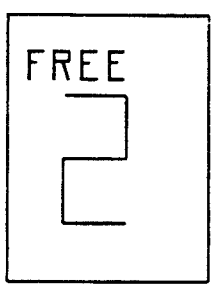
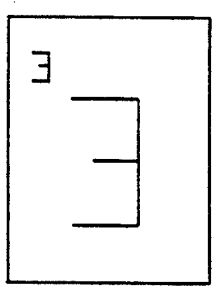
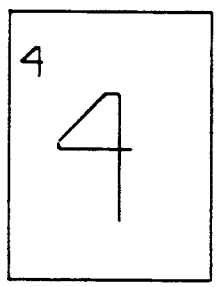
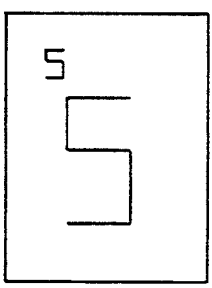
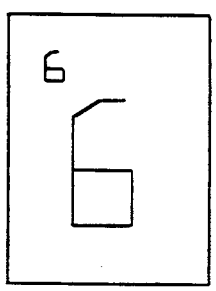
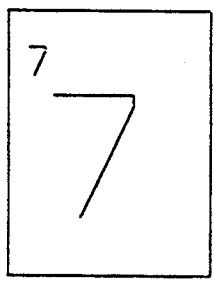
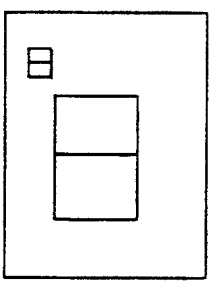
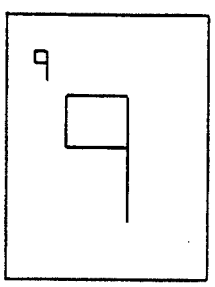
FIG. 2
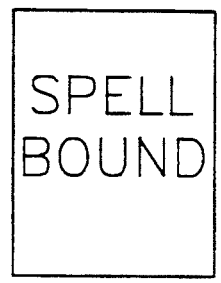

FIG. 4
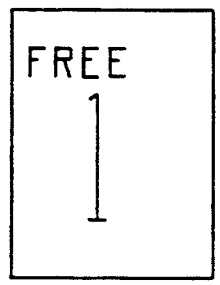 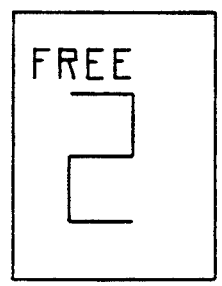 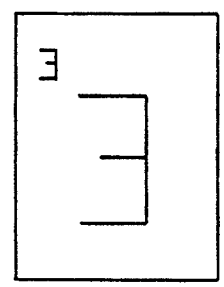
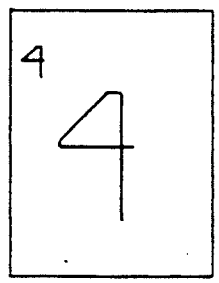 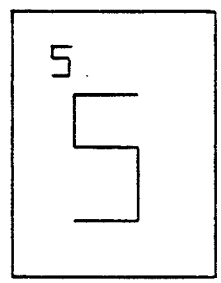 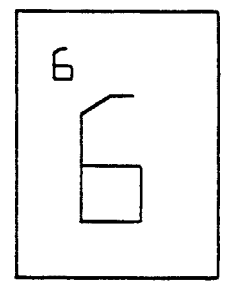
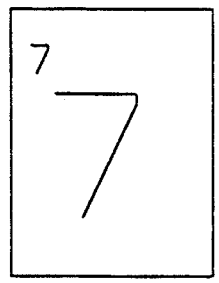 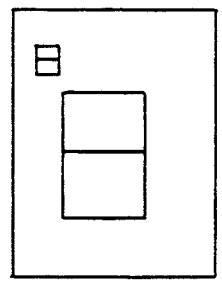 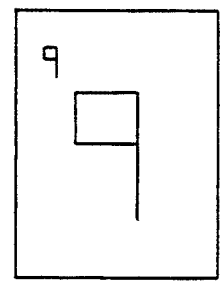

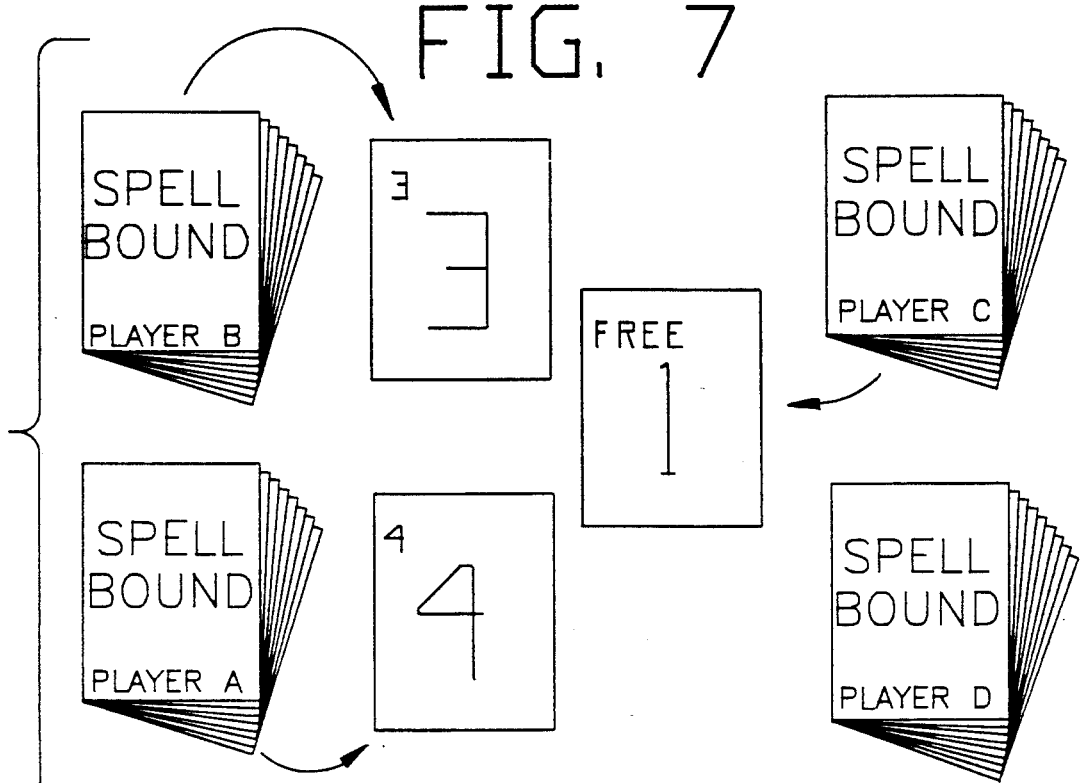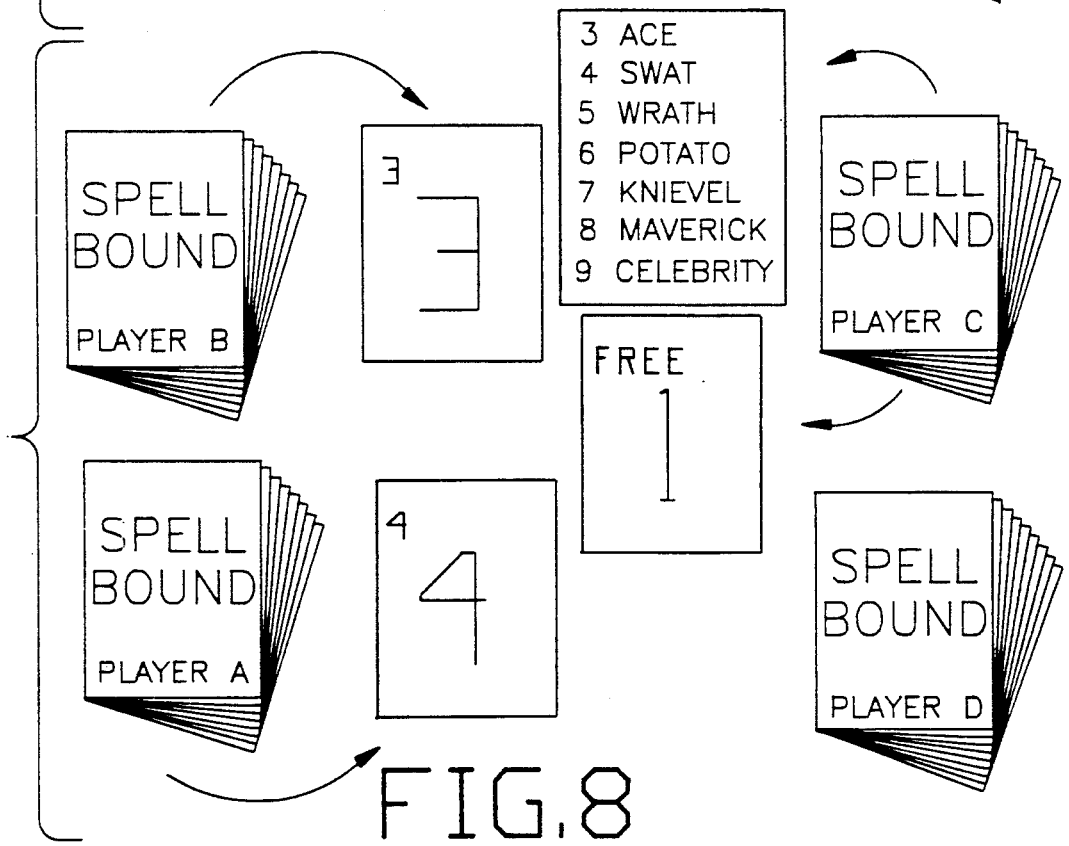

FIG. 9
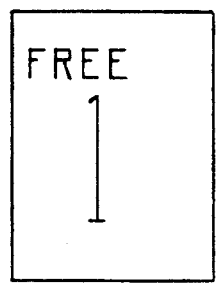
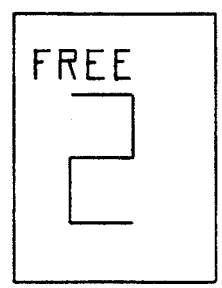
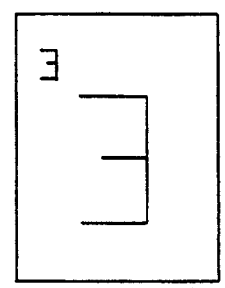
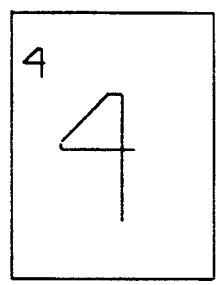
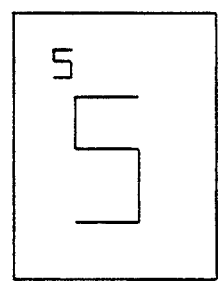
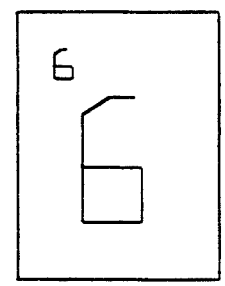
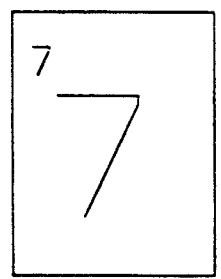
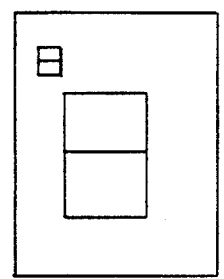
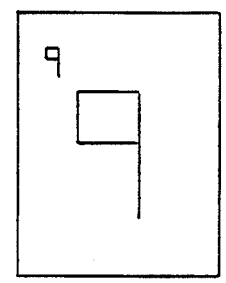
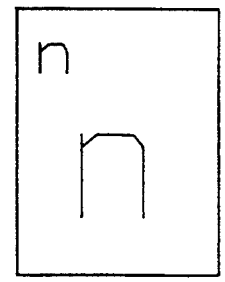

CARD GAME FOR SPELLING IMPROVEMENT AND EDUCATION

BACKGROUND OF THE INVENTION

1. Field of the Invention

This invention is in the field of a card game to facilitate the learning of spelling. Additionally, knowledge regarding other subjects such as religion, geography, history and government may also be learned secondarily.

2. Background Information

Some games have been devised where the players create words from indicia, for example, from letters available to them. However, these types of games have the fundamental approach wherein the players rely primarily on their own knowledge of words and their creation. The present invention differs substantially in that players are commanded to spell words of varying lengths depending on the cards played.

SUMMARY OF THE INVENTION

This invention is a game played with playing pieces. The playing pieces are usually cards but they can be blocks or other substrates. The game involves two sets of playing pieces, for example, two sets of playing cards.

An object of the invention is to facilitate the learning of spelling by the players of the game. Two or more players can play the game.

Another object of the invention is to provide an atmosphere of fun and enjoyment to the players while facilitating the learning of spelling. Additionally, the players of the game may test themselves, or gamble, on their ability while playing the game. This will be explained below in further detail.

Another object of the invention is to score points up to some preselected number of points.

Other objects of the invention are to increase the knowledge of the players with respect to subjects such as religion, sports, geography, history and government.

A first set of playing pieces or playing cards bears numerical indicia on the bottom side of the playing piece or playing card. A second set of playing pieces or playing cards bears word indicia on the bottom side of the playing piece or playing card. The cards bearing numerical indicia are played individually, or in combination, and their numerical sum is then added together. A player then spells a word having the number of letters determined by the numerical indicia played. The word to be spelled comes from a second set of playing pieces or playing cards. The second set of playing cards bears word indicia comprised of words having different lengths. Word length is synonymous with word size.

BRIEF DESCRIPTION OF THE DRAWINGS

FIG. 1 is a view of the bottom sides of: one series of the numbered pieces numbered 1 through 9, inclusive, of the first set of playing pieces or playing cards; and, a piece of the first set of playing pieces or playing cards bearing the indicia of a wizard.

FIG. 2 is a view of the typical top side of a piece of the first set of playing pieces or playing cards.

FIG. 4 is a view of the bottom sides of: one series of the first set of playing pieces or playing cards, numbered 1 through 9, inclusive, exposed, shown with the remaining pieces of the first set of pieces or playing cards not exposed in the form of a deck.

FIG. 7 is a view of a game as in FIG. 6 with the bottom sides of three pieces of the first set of playing pieces or playing cards exposed, one piece by each of three of the four players such that the number 4 has been exposed by Player A, the number 3 has been exposed by Player B, and the number 1 has been exposed by Player C.

FIG. 8 is a view of a game as shown in FIG. 7 which additionally shows a bottom side of a piece from said second set of playing pieces or playing cards exposed.

FIG. 9 is a view of the bottom sides of one series of the first set of playing pieces or playing cards completely exposed and being numbered 1 through some number n, inclusive FIG. 10 is a view of a piece of the second set of playing pieces or playing cards exposed illustrating words up to n letters.

Figure 3:
FIG. 3 is a view of the bottom sides of three representative pieces of the second set of playing pieces or playing cards, shown with the remaining pieces of the second set of playing pieces or playing cards not exposed in the form of a card deck.

A further understanding of the aforementioned figures will be gained in the Description of the Preferred Embodiment below.

DESCRIPTION OF THE PREFERRED EMBODIMENT

The preferred embodiment of the invention is played with a first set of playing pieces, usually playing cards and a second set of playing pieces, also usually playing cards. The first set of playing pieces have primarily numerical indicia on the bottom sides thereof. A limited number, usually two, of the first set of playing pieces bear the indicia of a WIZARD on the bottom sides thereof. FIG. 1 is a view of the bottom sides of one series of the numbered pieces numbered 1 through 9, inclusive, of the first set of playing pieces, and, a piece of the first set of playing pieces or playing cards bearing the indicia of a WIZARD.

In the preferred embodiment of the invention, there are four series of playing pieces numbered 1 through 9, inclusive, together with two pieces having the indicia of a WIZARD as shown in FIG. 1.

The preferred embodiment of the invention has been named SPELL BOUND. FIG. 2 is a view of the typical top side of a piece of the first set of playing pieces. As can be seen from FIG. 2, a graphic illustration of the words SPELL BOUND has been displayed. Obviously, the name given to the preferred embodiment of this invention is not limiting in regard to the invention. For instance, in other embodiments of the invention, different names could be given which are descriptive of the subject matter of the particular embodiment of the game. For instance, if the subject of sports is to be taught secondarily to the teaching of the spelling of words that have sports as their origin, the embodiment might be entitled SPORTS BOUND.

The preferred embodiment, therefore, has a first set of playing pieces comprising 38 pieces, made up of four series of pieces each bearing numerical indicia 1 through 9, inclusive, plus two pieces bearing WIZARD indicia. For decorative purposes, the preferred embodiment uses colors on a piece by piece basis for pieces coming from the first set of playing pieces. For instance, for those pieces bearing numerical indicia 1, the numeral itself as well as the word FREE are colored in green. No colors are shown in any figure of any drawing. In a similar fashion, numeral 2 is colored in red as is the word FREE, numeral 3 is colored in blue, numeral 4 is colored in orange, numeral 5 is colored in purple, numeral 6 is colored in brown, numeral 7 is colored in blue, numeral 8 is colored in violet, and numeral 9 is colored in yellow. The WIZARD illustrates a man, and he is colored with a variety of colors. As previously stated, the obverse side of the playing pieces, shown in FIG. 2 as the top side, bears thereupon the indicia SPELL BOUND. The words SPELL BOUND together with other decorative markings are colored primarily in red and blue as well as a variety of other colors. It should be understood that the colors of the aforementioned first set of playing pieces or playing cards could have any color or no color at all without deviating from the present invention.

FIG. 4 is a view of one series of the first set of playing pieces or playing cards, numbered 1 through 9, inclusive, exposed, shown with the remaining pieces of the first set of pieces or playing cards not exposed and being shown in the form of a deck. In the preferred embodiment, the deck as pictured in FIG. 4 has 29 pieces or cards which equals 38 minus 9.

FIG. 3 is a view of the bottom sides of three representative pieces of the second set of playing pieces or playing cards, shown with the remaining pieces of the second set of playing pieces or playing cards not exposed in the form of a card deck. The second set of playing pieces comprise a word deck. The bottom sides of each of the second set of playing pieces contains indicia being in the form of words. There are seven words on each playing piece, varying in length from three to nine letters. Namely, on each of the second set of playing pieces or playing cards exposed, there is a three letter word, a four letter word, a five letter word, a six letter word, a seven letter word, an eight letter word and a nine letter word. The nine letter word found on any of the bottom sides of the second set of playing pieces or playing cards, corresponds to the highest number found on the bottom sides of any of the first set of playing pieces or playing cards. This correspondence will be fully discussed below. The top side of the second set of playing pieces or playing cards, in the preferred embodiment, does not contain any indicia or marking whatsoever. The color of the top side of the second set of playing pieces or playing cards in the preferred embodiment is chartreuse (not shown in color). As previously indicated in regard to the first set of playing pieces, the color of the second set of playing pieces could be any color or having no color at all without deviating from the present invention.

Figure 5:
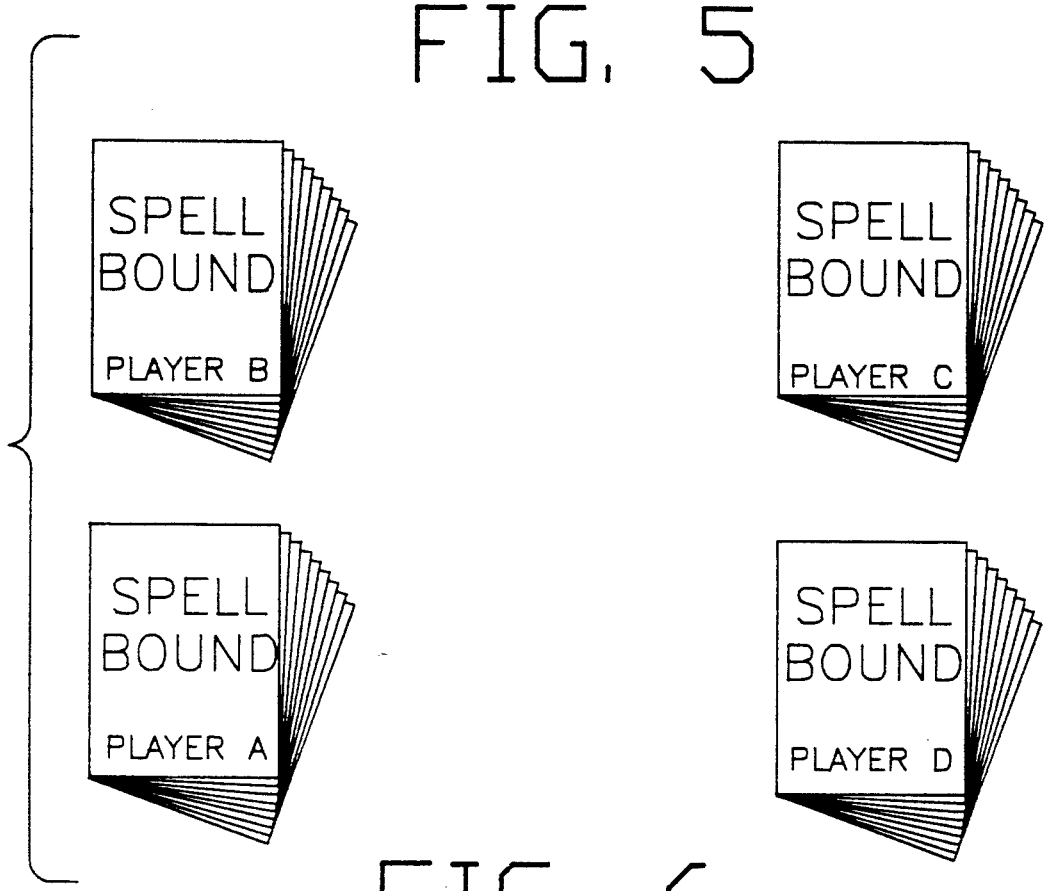
FIG. 5 is a view of a game, showing each of four players with 9 playing pieces or playing cards from said first set of playing pieces or playing cards, each said piece having the bottom side thereof not exposed.

In the preferred embodiment and with the optimal number of players, each of four players is dealt nine playing pieces or cards from the first set of playing pieces. The first set of playing pieces are shuffled prior to dealing them to the players. In the preferred embodiment there are four series of playing pieces, each numbered from 1 to 9, inclusive, in the first set of playing pieces. In addition to the four series, there are two WIZARD pieces or cards. When the first set of playing pieces are dealt, they are dealt with the bottom sides thereof not exposed. Commonly put, this dealing of the first set of playing pieces can be described as face down. After the players receive the first set of playing pieces dealt to them, they, of course, must look at the pieces but necessarily keep the pieces dealt to them from the view of the other players. FIG. 5 shows a game of Spell Bound in progress at a point in time after nine pieces of the first set of playing pieces have been dealt to each of four players. In FIG. 5, 36 pieces have been dealt. Two pieces of the first set of playing pieces have not been dealt and are not shown in FIG. 5. Ordinarily, the first set of playing pieces are dealt clockwise and play by the players follows in that fashion. For instance, Player A as shown in FIG. 5 is dealt to by Player D. Player A then is the first person to expose the bottom side of one of the playing pieces from those possessed by Player A.

The game begins with none of the bottom sides of the playing pieces of the first set of playing pieces or the second set of playing pieces exposed. The bottom sides of the second set of playing pieces are not exposed until after at least one bottom side of one playing pieces is exposed.

Hereinafter, playing pieces from the first set of playing pieces will be referred to as just playing pieces or numbered playing cards. In the preferred embodiment, the playing pieces are playing cards. Further, hereinafter, playing pieces from the second set of playing pieces will be referred to as word cards.

In the preferred embodiment, one of the objects of the invention is to score points up to some preselected number of points. First, the game begins by keeping all the playing pieces from both the first and second sets hidden from the view of the players. Next, the players are dealt a first set of playing pieces. Then, the numerical indicia on the bottom side of a piece of said first set of playing pieces is exposed by Player A.

Player A, after exposing the numerical indicia as aforestated, then automatically passes the play to Player B unless Player A exposed a numbered playing card bearing a 9. If Player A exposed a numbered playing card bearing a 9, then Player A must spell a nine letter word from a word card. Similarly, if Player A does not expose a numbered playing card bearing a 9, players subsequent to Player A may, solely or in combination, expose a numbered playing card or cards which additively total 9. The player playing a card which causes the additive total of played cards to total 9 must spell a nine letter word. Put another way, whenever the additive total of played number playing cards is 9, a nine letter word from a card of the word deck must be spelled.

Player B can either expose the numerical indicia on the bottom side of a piece or he can pass the action to Player C. If Player B exposes the numerical indicia on the bottom side of a piece, and the additive sum of the number cards exposed is less than nine, the action then passes to Player C. If the action passes to Player C, Player C can either expose the numerical indicia on the bottom side of a piece from the first set of playing pieces he was dealt or he can pass to Player D. If Player C passes to Player D, Player D can either expose the numerical indicia on the bottom side of a piece from the first set of playing pieces he was dealt or he can pass to Player A. If Player D passes to Player A, and if Players B, C and D do not play a card, Player A must then spell a word having a length equal to the number Player A exposed.

In the above described play, the preferred embodiment requires that a player be commanded to spell a word when the additive total of the numbered playing cards is 9 or whenever the play is passed back to the last player who has played a numbered playing card even though the additive sum is not 9. For instance, in FIG. 8, Player A has played a 4, Player B has played a 3 and Player C has played a 1. Player D could then choose to play a numbered playing card bearing a 1 or he could pass the action to player A without playing a card. If Player D plays a 1 he must then spell a word having 9 letters. Player D could also choose to pass the action to Player A. Player A, however, is not obligated to play at this time since Player C was the last player to play a numbered playing card, namely a card bearing a 1. In a similar fashion, Player A could then choose to pass the action to Player B or Player A could then attempt to spell an eight letter word from a card drawn from the word deck. Player B, however, is not obligated to play at this time since Player C was the last player to play a numbered playing card. Player B if he wishes could then spell an eight letter word or he could pass the action to Player C who, since he was the last player to play a card, must then spell an eight letter word.

A word having the length equal to the additive sum of all of the numbered playing cards exposed is read aloud to the player commanded to spell the word. A player is commanded to spell a word when the additive sum of the numbered playing cards is equal to 9 or when the play comes to a player and he was the first player to have played a card in that specific hand and he so chooses to spell a word. Additionally, a player is commanded to spell when he was the last player to play a card and the additive sum is less than 9 and the action has passed back to and past the player who has first played a numbered playing card. The word that is read aloud is read from a bottom side of one piece from the second set of playing pieces. The player that reads the word aloud can be any player other than the player being commanded to spell the word. The player being commanded to spell the word then attempts to spell it aloud. If the player commanded to spell does so correctly, then he scores points. A player scores points in the amount equal to the additive sum of the numbered playing pieces exposed. If a player spells incorrectly, then he loses points in the amount equal to the additive sum of numbered playing pieces exposed.

The mechanics of scoring and losing points is simple and aids the playing of the game by young people and those not adept at spelling. Points are scored by putting the pieces of the first set of playing pieces in a discard pile, face down, or, put another way, with the bottom sides not exposed. Points are lost by picking up the pieces of the first set of playing pieces and putting them in a player's hand.

As previously stated, when the game begins the first set of playing pieces are dealt to the players without exposing the bottom sides of the first set of playing pieces. Typically, the playing pieces or playing cards are dealt on a table, bottom side not exposed. Additionally, and typically, the playing pieces are then picked up by the players and put in the player's hand.

The game is played one hand at a time. A hand is defined as exposing one or more bottom sides of the first set of playing pieces by one or more players until a player does not have any playing pieces left in his hand.

The hand continues until one player uses all of the first set of playing pieces dealt to him. By uses, it is meant that the player exposes the bottom sides of all of the pieces of the first set of playing pieces or playing cards dealt to him or that may come into his hand and those pieces are not returned to the player. Put another way, the hand continues until any player does not have any playing pieces left in his hand. The game continues until a player scores a preselected amount of points.

The numbered playing cards of the preferred embodiment are numbered 1 through 9, inclusive. The numbered playing cards of the preferred embodiment bearing a number 1 or 2 receive special treatment in the scoring of points. For instance, as previously stated, the hand ends when any player does not have any numbered playing cards in his hand. At that time, each player determines the results of that hand and either scores points or loses points. All numbered playing cards which have been put into a player's hand are then added, with the exception of those numbered playing cards bearing a number 1 or 2 which are then placed in that player's discard pile. All numbered playing cards which have been put into a player's discard pile are then added. The additive sum of the cards in the player's hand is then subtracted from the additive sum of the cards in the player's discard pile. The result of the calculation is then tabulated for the respective player. The game ends when a player attains a preselected total of points.

In the event no player attains a preselected total of points, then another hand is dealt. The rotation of dealing hands in the preferred embodiment is clockwise beginning with Player D. Therefore, the rotation of dealing hands is DABC and repeats until the game is finished, to wit, a player attains a preselected total of points.

Figure 6:
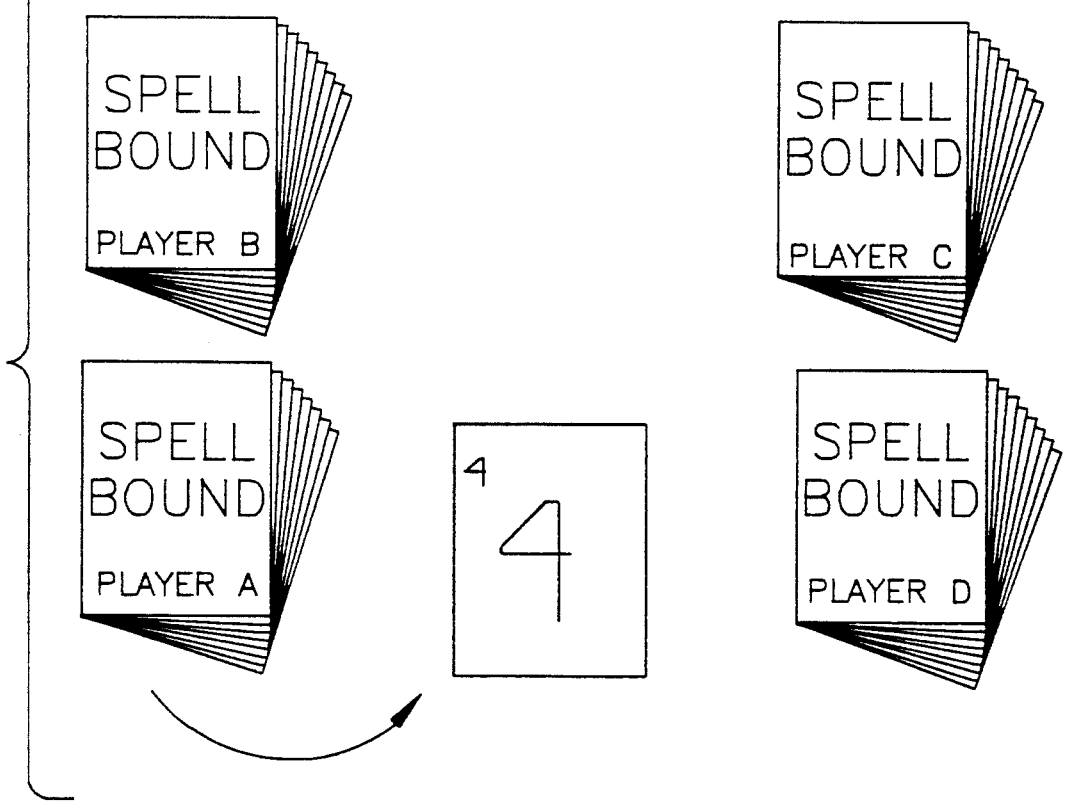
FIG. 6 is a view of a game as shown in FIG. 5 with a bottom side of a piece of the first set of playing pieces or playing cards for player A exposed such that the number 4 is displayed.

After the playing pieces from the first set of playing pieces have been dealt, Player A, then exposes the bottom side of one of the first set of playing pieces. FIG. 6 is a view of a game with Player A having exposed one piece of the first set of playing pieces dealt to him. In FIG. 6, Player A has exposed one of the numbered playing cards dealt to him. Player A has exposed a numbered playing card from the nine pieces that he was dealt.

In FIG. 6, Player A is the first person to expose a numbered playing card. Moreover, FIG. 6 is a view of a game just beginning, to wit, the first hand. In deciding to expose the bottom side of one of the pieces bearing a number 4, Player A has made a strategic decision. Player A, by exposing a numbered playing card bearing a number 4, is confident that he can spell four letter words. Hereinafter, exposing a numbered playing card will be described simply as playing a card. If Player A decided to play a numbered playing card having a 7, he is either confident that he can spell 7 letter words or he is bluffing Players B, C and D.

The first player to play a card in a hand does not have the option of commanding himself to spell a word having a given length unless, as previously stated a 9 is played. The only way a player can spell a word having a length equal to the number he has played is if all of the subsequent players pass the action back to him. The word cards have been previously described herein as pieces from the second set of playing pieces. The word card drawn from the word deck is not exposed to the player commanded to spell a word for the simple reason that he would then be able to see how the word he is being commanded to spell is spelled. For instance, if Players B, C and D pass the action to Player A, one of the Players B, C or D will draw a word card as shown in FIG. 8. Player A would then be commanded to spell the word SWAT from the word card has been drawn.

If Player A correctly spells SWAT he would then put the numbered playing card having the number 4 in his discard pile (not shown). Player A, by putting the numbered playing card face down in Player A's discard pile, has just scored four points. In the event Player A is commanded to spell a four letter word and attempts to do so but spells incorrectly, Player A must then return the numbered playing card to his hand. Obviously, if Player A had played a 7, there would be a greater chance that Players B, C and D would pass the action back to Player A without playing a card in addition to the 7 played by Player A.

In the event that Player A plays a numbered playing card bearing a 4, the action then passes to Player B. Player B must then play a numbered playing card or he may pass the action to Player C without playing a numbered playing card. In FIG. 7, the number 3 has been played by Player B. The sum of the numbered playing cards played by Player A and Player B is 7, or 4 plus 3. The action then passes to Player C who must then play a numbered playing card or pass the action to Player D. In FIG. 7, Player C has played a numbered playing card bearing a number 1. The sum of the numbered playing cards played by Players A, B and C is 8, or 4 plus 3 plus 1. The action then passes to Player D who must then play a numbered playing card or pass the action without playing a numbered playing card to Player A. The only card Player D could play would be a 1 since a card cannot be played which would cause the additiveness of the cards played to exceed 9. In FIG. 7, if Player D passes the action to Player A without playing a numbered playing card, then Player A has the option of spelling an eight letter word. If Player A does not wish to spell an eight letter word then the action passes to Player B who has the option of spelling an eight letter word. If Player B does not wish to spell an eight letter word the action then passes to Player C who must spell an eight letter word since he was the last Player to play a numbered playing card. If the action passes once around the hand to Player C as aforestated and if Player C spells the eight letter word correctly, the numbered playing cards, namely the 4 and 3 and 1, are placed, face down, in Player C's discard pile. If Player C spells the eight letter word incorrectly, then Player C must put all of the numbered playing cards, the 4, 3 and 1 in his hand. Spelling a word incorrectly loses points for a player since points in a player's hand at the end of the hand are, with the aforementioned exceptions, subtracted from the points scored, for example, subtracted from the additive sum of the cards placed in the player's discard pile.

In the preferred embodiment, another situation would have arisen if Player B had played a numbered playing card having a 5 (not shown). Player B, upon the action passing to him must play a numbered playing card having a 5 or less thereon if he so chooses to play a numbered playing card at all. For instance, if Player B played a card having a 5, Player B would have no option but to spell a nine letter word since the additive sum of the cards played equals nine. Similarly, if Player A had played a numbered playing card having a 9, he would have had to spell a nine letter word and the action would never have passed to Player B.

FIG. 8 is a view similar to FIG. 7 which additionally shows a word card exposed and the rest of the word deck from which it came unexposed. In regard to the foregoing discussion about a player attempting to spell a word correctly and failing to do so, a player may, upon spelling a word incorrectly, play a WIZARD card if he possesses one in his hand. WIZARD cards are members of the number deck.

The preferred embodiment of the invention employs two WIZARD cards per number deck. The number deck is comprised of four series of numbered playing cards numbered 1 through 9, inclusive, plus two WIZARD cards for a total of 38 playing pieces in the number deck. It has been found that one number deck will support four players. If there are more than four players, then two decks may be used or less than nine cards may be dealt to each player.

One of the WIZARD cards or playing pieces is shown in FIG. 1. WIZARD cards are neither added to a Player's score or subtracted from a Player's score at the conclusion of the game. WIZARD cards facilitate scoring by a Player, provided, of course, that he is lucky enough to have been dealt one. For instance, Player C in the foregoing example could have employed a WIZARD card if he had spelled a word incorrectly. Obviously, given that more points are scored for words having long lengths, the use of the WIZARD card may be more efficient after having spelled a long word incorrectly. Additionally, if a player is dealt a WIZARD card he may keep it in his hand for protection meaning that if the hand ends the number cards in said player's hand do not count for nor against said player in computing said player's score. The WIZARD card itself does not count in scoring.

If a given group of players are particularly able spellers, than a game having larger numbers, for example greater than 9, may be used in the number deck. For instance, numbers as high as 15 or 20, or higher, may be used in the number deck. For example, there would then be four series of the numbered playing cards numbered 1 through 15, inclusive, and necessarily the word deck would have words having up to fifteen letters in length. FIG. 9 illustrates a number deck wherein the numbered playing cards may have numbers as high as some undetermined positive number n. FIG. 10 is a word card illustrating words having word lengths up to some letter n.

In the event that the game is played with a number deck having numbered playing cards up to some number n, then if a numbered playing card has the number n thereon, or, if the sum of the numbered playing pieces total n, then the player must spell a word having n letters. In the event that the game is played with numbered playing cards having the number n and numbered word cards having words of length n, then additional WIZARD cards may be employed.

Although this invention has been described in its preferred form and preferred practice with a certain degree of particularity, it is understood that the disclosure has been made by way of example and that numerous changes in the details of construction and the combination and arrangement of parts and steps may be resorted to without departing from the spirit and scope of the invention as hereinafter claimed.

What is claimed is:

1. Playing apparatus comprising a first set of playing pieces, said first set of playing pieces being generally flat, said first set of playing pieces each having a top side and a bottom side, said bottom side of each piece bearing thereupon indicia, said indicia bearing upon said bottom side of each piece of said first set of playing pieces is a numerical indicia having positive integers, a second set of playing pieces, each said piece of said second set of playing pieces being generally flat, said second set of playing pieces each having a top side and a bottom side, said bottom side of each piece bearing thereupon word indicia, said word indicia bearing upon said bottom side of each piece of said second set of playing pieces includes a plurality of words having different lengths, and wherein said words are in the form of a list, said words having lengths from and including three letters up to and including n letters.

2. Playing apparatus as claimed in claim 1 wherein said positive integers include 1 up to and including some positive integers n.

3. Playing apparatus as claimed in claim 2 wherein said first set of playing pieces and said second set of playing pieces are playing cards.

4. Playing apparatus as claimed in claim 2 wherein said bottom side of each piece of said first set of playing pieces bearing thereupon positive integers 1 or 2 include further additional word indicia bearing thereupon.

5. Playing apparatus as claimed in claim 4 wherein said additional word indicia is FREE.

6. A method for players to practice spelling, said players using first and second sets of playing pieces having top and bottom sides, said bottom sides of said first set of playing pieces having numerical indicia bearing thereupon, said numerical indicia of said first set of playing pieces representing points to be added to or subtracted from the score of said players, said bottom sides of said second set of playing pieces having multiple word indicia of varying lengths bearing thereupon, each player having a discard pile, said method for practicing spelling comprising the steps of keeping the bottom sides of all playing pieces not yet played hidden from the view of the players, dealing a first set of playing pieces to players, exposing numerical indicia on a bottom side of a piece of said first set of playing pieces, commanding a player that exposed said numerical indicia on said bottom side of said first set of playing pieces to spell a word, reading a word aloud from a bottom side of a piece from a second set of playing pieces to said player being commanded to spell said word, said word having a letter length equal to said numerical indicia exposed from said piece of said first set of playing pieces, attempting to spell correctly said word by said player being commanded to spell said word, scoring points by said player commanded to spell said word when said word is spelled correctly, and subtracting points from said player commanded to spell said word when said word is spelled incorrectly.

7. A method for practicing spelling comprising said method for practicing spelling as claimed in claim 6 wherein the step of exposing numerical indicia on said bottom side of a piece of said first set of playing pieces is performed, successively and sequentially, by one player after another, resulting in exposure of said bottom sides of more than one piece of said first set of playing pieces.

8. A method for practicing spelling as claimed in claim 7 further comprising the steps of adding the sum of said numerical indicia exposed, and exposing numerical indicia on said bottom sides of said first set of playing pieces continuing provided said sum of said numerical indicia is less than or equal to 9.

9. A method for practicing spelling as claimed in claim 7 wherein the step of exposing numerical indicia on said bottom sides of said pieces of said first set of playing pieces continuing provided said sum of said numerical indicia is less than or equal to n.

10. A method for practicing spelling as claimed in claim 9 wherein the steps of scoring points by said player being by placing each piece of said first set of playing pieces whose bottom side is exposed in a discard pile of said player and adding said numerical indicia of each said piece in said discard file to a score of said player when said player spells said word correctly, and subtracting said numerical indicia of each said piece from said score of said player by returning said pieces of said first set of playing pieces exposed to said player when said player spells a word incorrectly.

11. A method for practicing spelling as claimed in claim 10 wherein the step of scoring points includes adding numerical indicia of each said piece of said first set of playing pieces bearing thereupon a positive integer of 1 or 2.

12. A method for practicing spelling as claimed in claim 11 including at least one piece of said first set of playing pieces having an indicia of a WIZARD bearing thereupon, wherein the step of scoring points includes possessing and playing a piece of said first of playing pieces bearing thereupon an indicia of a WIZARD after spelling said word incorrectly, said numerical indicia of all said pieces previously played being added to said score of said player.

13. A method for practicing spelling as claimed in claim 12 further comprising the step of discontinuing exposure of said bottom side of any piece when a player spells a word correctly, and said player having exposed said bottom sides of all of said pieces of said first set possessed by said player.

14. A method for practicing spelling as claimed in claim 6 further comprising the step of returning said piece of said first set of playing pieces exposed by said player to said player spelling a word incorrectly.

15. A method for practicing spelling, said method for practicing spelling as claimed in claim 6 wherein said step of commanding a player that exposed said numerical indicia is performed by said player exposing said numerical indicia.

* * * * *